United States Patent
Jeremić et al.

(10) Patent No.: US 11,124,440 B2
(45) Date of Patent: Sep. 21, 2021

(54) METHOD FOR LIQUID PURIFICATION BY HYDRODYNAMIC CAVITATION AND DEVICE FOR CARRYING OUT SAID METHOD

(71) Applicants: Milan Jeremić, Šentvid pri Stični (SI); Dragan Jeremić, Šentvid pri Stični (SI); Srečko Čadonič, Brezovica (SI); Miro Medvešek, Ljubljana (SI)

(72) Inventors: Milan Jeremić, Šentvid pri Stični (SI); Dragan Jeremić, Šentvid pri Stični (SI); Srečko Čadonič, Brezovica (SI); Miro Medvešek, Ljubljana (SI)

( * ) Notice: Subject to any disclaimer, the term of this patent is extended or adjusted under 35 U.S.C. 154(b) by 101 days.

(21) Appl. No.: 16/610,960

(22) PCT Filed: May 7, 2018

(86) PCT No.: PCT/IB2018/053146
§ 371 (c)(1),
(2) Date: Nov. 5, 2019

(87) PCT Pub. No.: WO2018/207071
PCT Pub. Date: Nov. 15, 2018

(65) Prior Publication Data
US 2020/0071216 A1    Mar. 5, 2020

(30) Foreign Application Priority Data

May 8, 2017 (SI) ................................. P-201700125
Jun. 5, 2017 (SI) ................................. P-201700155
Sep. 25, 2017 (SI) ................................. P-201700267

(51) Int. Cl.
C02F 1/34 (2006.01)
C02F 1/72 (2006.01)
(Continued)

(52) U.S. Cl.
CPC ............ C02F 9/00 (2013.01); B01D 17/0205 (2013.01); B01D 19/0068 (2013.01);
(Continued)

(58) Field of Classification Search
CPC .... C02F 9/00; C02F 1/001; C02F 1/34; C02F 1/727; C02F 1/74; C02F 2103/34;
(Continued)

(56) References Cited

U.S. PATENT DOCUMENTS 5,393,417 A * 2/1995 Cox ...................... C02F 3/1294
210/96.1
6,045,068 A * 4/2000 Ashbrook ................ B01F 3/10
241/5
(Continued)

Primary Examiner — Joseph W Drodge
(74) Attorney, Agent, or Firm — Saliwanchik, Lloyd & Eisenschenk

(57) ABSTRACT

The present invention relates to a method for liquid media purification, such as potable water, where biological and chemical composition of fluid to be purified is enhanced. The invention also relates to a device for carrying out said method. According to the invention, the liquid is purified by removing coarse particles from said liquid on first filtering means (2), dispersing the liquid with at least one nozzle (3) into a working chamber (4), where it is exposed to a working pressure and gas or gas mixture is introduced in the chamber from at least one inlet aperture (5).

18 Claims, 2 Drawing Sheets

Figure 1:
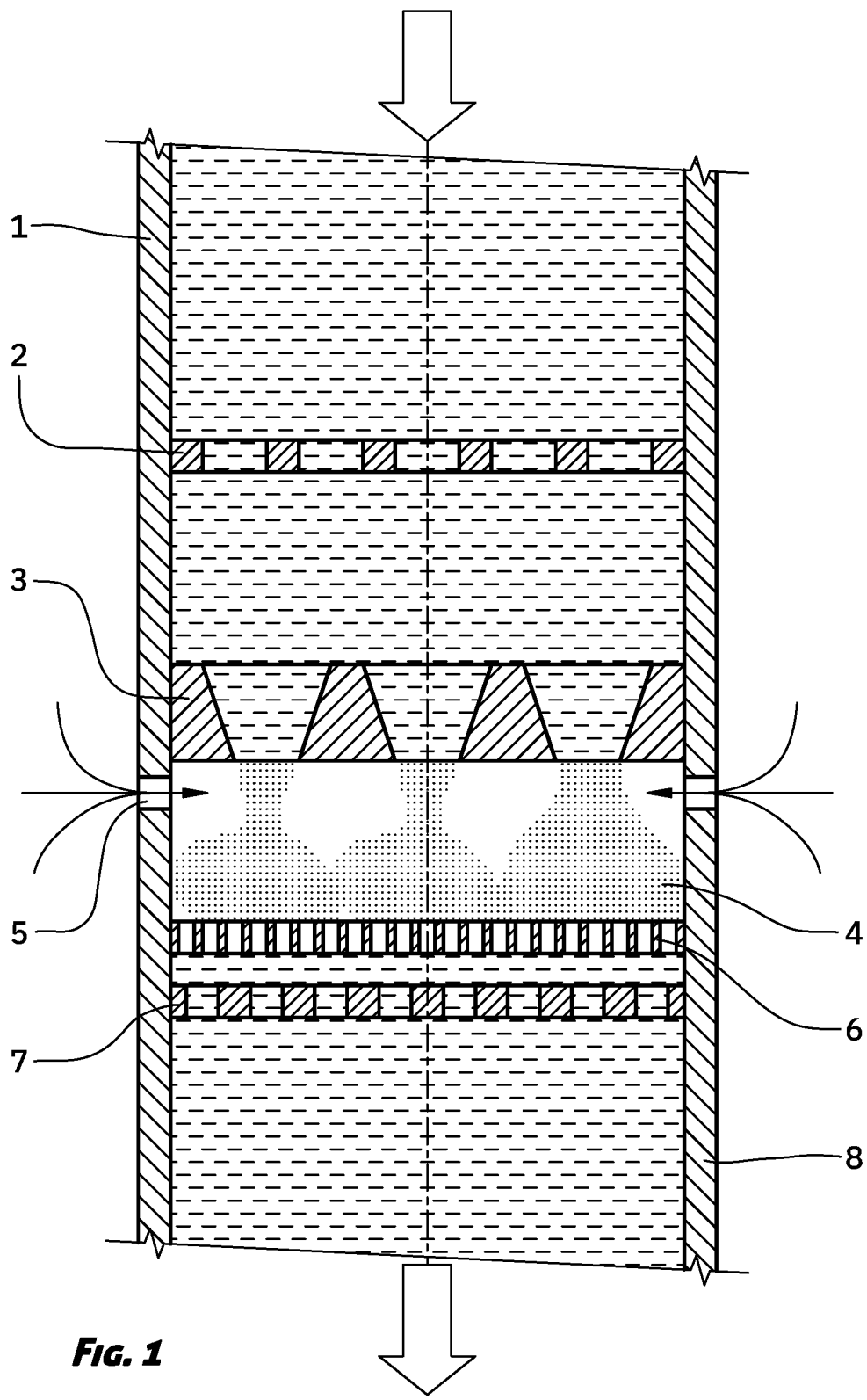

(51) Int. Cl.
*C02F 1/74* (2006.01)
*C02F 9/00* (2006.01)
*B01D 17/02* (2006.01)
*B01D 19/00* (2006.01)
*B01D 29/56* (2006.01)
*B01D 36/00* (2006.01)
*B01D 37/00* (2006.01)
*C02F 1/00* (2006.01)
*C02F 103/34* (2006.01)

(52) U.S. Cl.
CPC ............ *B01D 29/56* (2013.01); *B01D 36/00* (2013.01); *B01D 37/00* (2013.01); *C02F 1/001* (2013.01); *C02F 1/34* (2013.01); *C02F 1/727* (2013.01); *C02F 1/74* (2013.01); *C02F 2103/34* (2013.01); *C02F 2303/02* (2013.01); *C02F 2303/04* (2013.01); *C02F 2303/22* (2013.01); *C02F 2303/24* (2013.01)

(58) Field of Classification Search
CPC ............ C02F 2303/02; C02F 2303/04; C02F 2303/22; C02F 2303/24; C02F 1/72; C02F 1/004; C02F 1/36; B01D 17/0205; B01D 19/0042; B01D 19/0063; B01D 19/0068; B01D 19/0094; B01D 29/0052; B01D 29/56; B01D 36/00; B01D 36/001; B01D 36/02; B01D 37/00; B01F 11/02; B01F 11/0208; B01F 11/0283; B01F 15/0254; B01F 15/026; B01F 15/0263; B01F 15/0266; B01F 15/027; B01F 15/0274
See application file for complete search history.

(56) References Cited

U.S. PATENT DOCUMENTS

| | | | | |
|---|---|---|---|---|
| 6,200,486 B1* | 3/2001 | Chahine | ............ | C02F 1/34 |
| | | | | 210/175 |
| 6,221,260 B1* | 4/2001 | Chahine | ............ | A61L 2/02 |
| | | | | 210/175 |
| 6,811,712 B2* | 11/2004 | Romanyszyn | ........ | B01F 5/0256 |
| | | | | 210/512.1 |
| 2008/0257828 A1* | 10/2008 | Kelsey | ............ | C02F 1/34 |
| | | | | 210/738 |
| 2008/0277354 A1 | 11/2008 | Baerheim et al. | | |
| 2009/0026133 A1* | 1/2009 | Kelsey | ............ | C02F 1/34 |
| | | | | 210/607 |
| 2009/0200231 A1* | 8/2009 | Walton | ............ | C02F 11/04 |
| | | | | 210/631 |
| 2013/0248429 A1* | 9/2013 | Dahule | ............ | C02F 1/34 |
| | | | | 210/150 |
| 2014/0116942 A1* | 5/2014 | Gordon | ............ | C02F 1/463 |
| | | | | 210/638 |
| 2014/0246369 A1* | 9/2014 | Stephenson | ........ | C02F 3/1221 |
| | | | | 210/605 |
| 2015/0166383 A1* | 6/2015 | Visnja | ............ | C02F 1/325 |
| | | | | 205/752 |
| 2015/0353380 A1* | 12/2015 | Profit | ............ | C02F 1/20 |
| | | | | 210/750 |
| 2016/0158717 A1* | 6/2016 | Sprague | ........ | B01F 11/0283 |
| | | | | 366/108 |

* cited by examiner

METHOD FOR LIQUID PURIFICATION BY HYDRODYNAMIC CAVITATION AND DEVICE FOR CARRYING OUT SAID METHOD

CROSS REFERENCE TO RELATED APPLICATIONS

This application is a National Stage of International Application No. PCT/IB2018/053146, filed on May 7, 2018; which claims priority to Solvenia Application Nos. P-201700125, filed May 8, 2017, P-201700155, filed Jun. 5, 2017, and P-201700267, filed Sep. 25, 2017, all of which are hereby incorporated by reference in their entirety.

The present invention relates to a method for liquid media purification, such as water, where biological and chemical composition of fluid to be purified is enhanced. The invention also relates to a device for carrying out said method.

Known methods for liquid media purification, such as potable water, are relatively demanding and require complex devices that perform fluid purification separately in view of biological and chemical sense. Further, with the known state of the art fluids are treated in homogenized state of matter and at pressure equal or higher to the ambient pressure. Therefore, complex, big and high-priced plants are required, the size thereof increases rapidly with the volume of the fluid to be purified.

It is the object of the present invention to create a method for liquid media purification, which remedies drawbacks of the know solutions. The object of the invention also relates to a device for carrying out said method.

According to the present invention, the object as set above is solved by features set forth in the characterising part of claim 1. Detail of the invention is disclosed in respective subclaims.

Figure 2:
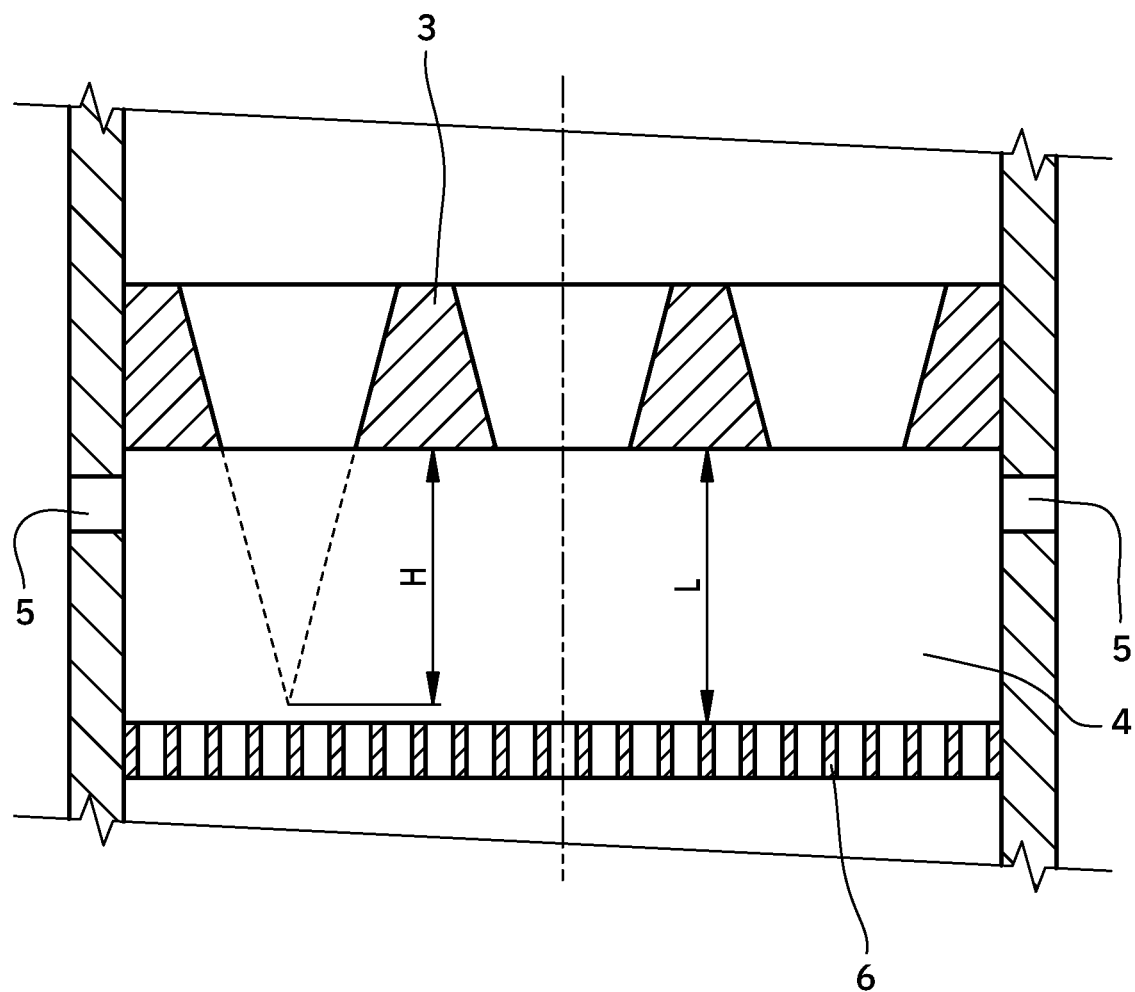

The invention is further described in detail by way of non-limiting embodiment, and with a reference to the accompanying drawings, where FIG. 1 shows a schematic cross-sectional view of a device for purification of liquid media, FIG. 2 shows a detail of the device of FIG. 1.

A method for liquid media purification starts with feeding fluid to be purified having a first flow rate $Q_1$ and a supply pressure $p_1$ trough a supply line 1. Said homogenized fluid is further guided trough a filtration means 2 located downstream, where elimination of rough particles from the fluid and fluid flow streaming take place. At the exit from said filtration means 2 the first stage of the hydrodynamic cavitation of the fluid to be purified takes place, wherein the flow rate is reduced due to decreased free cross-section on a filtration means 2 to a second flow rate $Q_2$.

The fluid pre-treated in the above described manner having the second flow $Q_2$ is then passed through a dispensing means 3, arranged downstream with respect to said filtering means 2. Said dispensing means 3 comprises at least one nozzle 9 through which the liquid from the supply line 1 enters a chamber 4 for the liquid treatment. At the exit of said at least one nozzle 9, hydrodynamic cavitation of the fluid to be purified takes place in the fluid treatment chamber 4, wherein at least one spray jet with a high content of cavitation bubbles is formed of said fluid. The liquid flowing out of the chamber 4 creates a working pressure $p_2$ in said chamber 4, which is lower than the pressure $p_1$ of the supplied fluid and simultaneously lower than the ambient pressure, resulting in the suction of the surrounding gas or mixture of gases into the chamber 4.

A strong hydrodynamic cavitation and simultaneous implosion of cavitation bubbles in a combination with strong under-pressure aeration takes place in said chamber 4. By means of said implosion of cavitation bubbles in the sub-pressure environment, it is achieved strong liquid dispersion, strong oxidation of impurities in the fluid, and substantial removal of gases from the liquid. Said liquid dispersion and the influence of the under-pressure cause an increase of the liquid surface in the flow movement through said chamber 4.

Consequently, gases and impurities which oxidise are eliminated from the liquid to be purified. In the changed aggregate state, which is a result of said hydrodynamic cavitation, the pressure lower than the ambient pressure, and the supply of gas or gas mixture, dissociation of the molecules of the liquid takes place, which greatly increases the surface of the liquid to be purified. The result is excellent disinfection of said liquid and the elimination of various impurities.

Said gas or gas mixture is introduced into the chamber 4 through at least one aperture 5 in the wall of the chamber 4, wherein said at least one aperture 5 in said chamber 4 is formed in an area neighbouring the dispensing means 3. Thus, said gas or gas mixture affects dissociated liquid molecules.

Said working pressure $p_2$ occurring in said working chamber 4 is stronger than the cohesion forces between the molecules of liquid to be purified and dispersed in working chamber 4, thus, rendering the liquid easily accessible to the influence of the disinfectants. The height of the working pressure $p_2$ depends on the amount of gas or gas mixture entering the working chamber 4 through at least one aperture 5, and the traction force of the already treated liquid with a pressure $p_3$, which leaves the chamber 4 in the homogenized state via a discharge line 8. It is provided for according to the present invention that the relations between the pressures $p_1$, $p_2$, $p_3$ are such that $p_1 > p_2$ and $p_2 < p_3 \leq p_1$.

Said gas supplied to said working chamber 4 through said at least one aperture 5 is, for example, selected as oxygen. Furthermore, said gas mixture supplied to said working chamber 4 through said at least one aperture 5, for example, is selected as air.

Spaced downstream from said dispersing means 3 a first homogenization means 6 is arranged, which is intended to homogenize the purified liquid. Optionally, spaced downstream a second homogenization means 7 is associated with the first homogenization means 6, the discharge line 8 for discharging the purified liquid being connected to said homogenization means 7.

As mentioned above, it is provided for according to the invention that said dispensing means 3 comprises at least one nozzle 9, by means of which the cavitation of the liquid to be purified is created. Said each nozzle 9 is formed in a manner to converge in the direction of the flow of liquid to be purified. In addition, the preferred form of each nozzle 9 is such that the internal cross-section thereof linearly tappers in the direction of the flow of said liquid.

A length L of said chamber 4, viewed in the direction of the flow of the fluid to be purified, approximately equals to a distance H between the lower surface of said dispensing means 3 and the apex of an imaginary cone formed by the jet of said liquid coming out of the nozzle 9. In the preferred embodiment of the device for carrying out the method according to the invention, said length L of said chamber 4 lies in the range between about 0.8×H and about 1.1×H.

A cross-section A of said at least one aperture 5 or of the sum of all apertures 5 for supplying gas or gas mixture into the working chamber 4 depends on said second flow $Q_2$ of the liquid to be purified flowing through the cross-section $A_t$ of said at least one nozzle 9 or the sum of all nozzles 9 through which said liquid enters the working chamber 4. In the preferred embodiment of the device for carrying out the process according to the invention, said cross-section $A_z$ is selected as a power function of the second flow $Q_2$, i.e. $A_2 = f(Q_2^n)$. The exponent n is preferably selected in the range of about n=½, where the deviation of ±15% in the order of magnitude is possible. As an example, it should be noted that, with the flow $Q_2$=400 l/min of the liquid to be purified, the surface $A_z$ of said at least one aperture 5 and, respectively, the sum of all apertures 5 for supplying gas or a gas mixture into the working chamber 4, is 20 mm²±15%.

According to the present invention, it is provided that said at least one aperture 5 for supplying gas or gas mixture is provided with a blocking means, for example a valve or the like. Said measure controls the amount of gas or gas mixture to be delivered into said working chamber 4, and the said pressure $p_2$.

Furthermore, it is provided for according to the present invention that said first homogenization means 6 is formed with finer through holes than the filtering means 2 and, respectively, the second homogenization means 7.

Moreover, it is provided for according to the present invention that the purified liquid leaves the working chamber 4 through the discharge line 8 by means of gravity. However, an embodiment is possible, in which the discharge line 8 is fluidly connected to the pumping means, which discharge the purified liquid by force.

The method and device for carrying out the method are widely used in many areas, such as treatment of potable, industrial, agricultural and waste water. The method and the device are suitable for the reduction of limescale, the destruction of micro-organisms in the water, the elimination of legionella and pesticides in water, the removal of organic and inorganic pollutants from the water, the increase in the efficiency of the added water disinfectants and the like. In addition, said method and said device significantly reduces the opacity of the water and improves the taste and smell of the water. In addition, it turns out that the method according to the invention leads to the formation of scale in aragonite form, rather than a calcite form.

The invention claimed is:

1. A method for liquid media purification, which improves the biological and chemical composition of a liquid to be purified, characterized in that it comprises the following steps:
   a) supplying, via a supply line, said liquid to be purified, said liquid to be purified having a first flow rate $Q_1$, an inlet pressure $p_1$, and a first flow direction,
   b) removing coarse particles from said liquid to be purified via a first filtering means arranged in said first flow direction, said first filtering means having an inlet and an outlet, and said first filtering means directing said liquid to be purified in said first flow direction,
   c) performing a first stage of cavitation on said liquid to be purified at said outlet of said first filtering means, wherein said first flow rate $Q_1$ is reduced to a second flowrate $Q_2$,
   d) directing said liquid to be purified having said second flow rate $Q_2$ and said inlet pressure $p_1$ through a dispersing means comprising at least one nozzle, said dispersing means being arranged downstream of said first filtering means,
   e) dispersing said liquid to be purified by means of said at least one nozzle into a liquid treatment chamber in which there is a working pressure $p_2$, wherein a second stage of cavitation occurs, leading to a breakdown of cohesion bonds between molecules of said liquid to be purified, and leading to creation of a plurality of dissociated molecules within said liquid to be purified,
   f) supplying a gas or gas mixture into said liquid treatment chamber through at least one gas inlet aperture in said chamber, and enabling said gas or gas mixture to affect said plurality of dissociated molecules, thus creating a dispersed purified liquid,
   g) liquefying said dispersed purified liquid at a first homogenization means arranged downstream of said liquid treatment chamber, thus creating a purified liquid, and
   h) discharging and degassing said purified liquid into a discharge line having a discharge pressure $p_3$, and optionally a second homogenization means arranged within said discharge line.

2. The method according to claim 1, characterized in that said pressures $p_1$, $p_2$, and $p_3$, respectively, are such that $p_1 > p_2$ and $p_2 < p_3 \leq p_1$.

3. The process according to claim 1, characterized in that said working pressure $p_2$ is lower than ambient pressure.

4. The process according to claim 1, characterized in that said gas or gas mixture supplied to said liquid treatment chamber through said at least one gas inlet aperture is oxygen.

5. The process according to claim 1, characterized in that said gas or gas mixture supplied to said liquid treatment chamber through said at least one gas inlet aperture is air.

6. The method, according to claim 1, wherein said purified liquid is potable water.

7. A device for producing a purified liquid, the device comprising:
   a supply line for supplying a liquid to be purified, said liquid to be purified having a first flow rate $Q_1$ and a first flow direction within said supply line;
   a first filtering means for removing coarse particles from said liquid to be purified, said first filtering means arranged in said first flow direction within said supply line;
   a dispersing means arranged downstream of and adjacent said first filtering means and configured to create a first stage of cavitation in said liquid to be purified;
   a liquid treatment chamber for treating said liquid to be purified;
   said liquid treatment chamber comprising at least one gas inlet aperture for supplying a gas or gas mixture into said liquid treatment chamber;
   a second filtering means arranged downstream of said dispersing means;
   optionally, a third filtering means arranged downstream of said second filtering means;
   a first homogenization means arranged downstream of said liquid treatment chamber; and
   a discharge line for discharging and degassing said purified liquid from said liquid treatment chamber and connected thereto; and
   optionally, a second homogenization means arranged within said discharge line.

8. The device according to claim 7, characterized in that said dispersing means comprises at least one nozzle converging in said first flow direction.

9. The device according to claim 8, characterized in that a cross-section $A_z$ of said at least one gas inlet aperture for supplying said gas or gas mixture into said liquid treatment chamber is selected based on a second flow rate $Q_2$ of said liquid to be purified through a cross-section $A_t$ of said at least one nozzle, through which said liquid to be purified is dispersing into said liquid treatment chamber.

10. The device according to claim 7, characterized in that said at least one gas inlet aperture in said liquid treatment chamber is formed in a region neighboring said dispersing means.

11. The device according to claim 7, characterized in that a length L of said liquid treatment chamber in said first flow direction approximately equals a distance H between a downstream surface of said dispersing means and an apex of an imaginary cone formed by a projection from one or more sidewalls of said at least one nozzle converging in said first flow direction.

12. The device according to claim 11, characterized in that said length L of said chamber is between 0.8×H and 1.1×H.

13. The device according to claim 9, characterized in that said cross-section $A_z$ is selected based on a power function of said second flow rate $Q_2$, such that $A_z = f(Q''_2)$.

14. The device according to claim 13, characterized in that said exponent n is in a range around n=½, within a deviation of ±15% in order of magnitude.

15. The device according to claim 7, characterized in that said at least one gas inlet aperture for supplying said gas or gas mixture is provided with a blocking means.

16. The device according to claim 7, characterized in that said first homogenization means comprises one or more first homogenization through holes, said second homogenization means comprises one or more second homogenization through holes, and said first filtering means comprises one or more first filtering through holes; said one or more first homogenization through holes being finer than said one or more second homogenization through holes; and said one or more first homogenization through holes being finer than said one or more first filtering through holes.

17. The device according to claim 7, characterized in that said discharge line is fluidly connected to a pumping means.

18. The device, according to claim 15, wherein said blocking means is a valve configured to control an amount of said gas or gas mixture to be delivered into said liquid treatment chamber.

* * * * *